United States Patent [19]

Laskowski et al.

[11] Patent Number: 4,878,411

[45] Date of Patent: Nov. 7, 1989

[54] BAND SAW WHEEL

[75] Inventors: Donald R. Laskowski, Indianapolis; Daniel R. Tekulve, Batesville, both of Ind.

[73] Assignee: Laskowski Enterprises, Inc., Indianapolis, Ind.

[21] Appl. No.: 682,826

[22] Filed: Dec. 19, 1984

[51] Int. Cl.$^4$ .................... B26D 1/46; B27B 13/00
[52] U.S. Cl. ....................... 83/820; 30/380; 474/178; 474/191
[58] Field of Search ............ 30/380; 83/780, 820; 474/178, 191

[56] References Cited

U.S. PATENT DOCUMENTS

| | | | |
|---|---|---|---|
| 2,747,420 | 5/1956 | Beck | 474/191 X |
| 3,177,733 | 4/1965 | Yamano | 474/178 |
| 3,935,780 | 2/1976 | Hoffmann | 83/820 |
| 3,968,715 | 7/1976 | Cleland | 83/820 |

*Primary Examiner*—Douglas D. Watts
*Attorney, Agent, or Firm*—Barnes & Thornburg

[57] ABSTRACT

A band saw wheel and blade combination including a pulley having a peripheral groove and a tire mated with and received within the groove. The tire has an inner diameter greater than the inner diameter of the groove to be free floating within the groove. The band saw blade is received against the outside surface of the tire and forces the tire into the groove. As a result, a firm frictional contact between the tire and the pulley and between the band saw blade and the tire is achieved to provide a strong driving force of the blade by the pulley.

8 Claims, 1 Drawing Sheet

BAND SAW WHEEL

BACKGROUND OF THE INVENTION

This application is a continuation of Ser. No. 06/475,363 filed Mar. 14, 1983, now abandoned.

1. Field of the Invention:

This invention relates generally to the driving surface of band saw wheels and more particularly to a new, simpler, and improved method of providing an inexpensive replaceable, positive drive surface for band saw wheels.

1. Description of the Prior Art:

Conventionally, band saw wheels typically have one of three band saw driving surfaces. All three approaches provide a means of keeping the blade tracking true on the wheel. One approach incorporates a metal pulley having a flat driving surface and a flanged side against which the back side of the blade rides. This system requires high band strain to provide required driving force particularly since the steel band against the steel wheel has a low coefficient of friction. Also, contact of the band against the flange causes work hardening and premature failure of the band saw blade.

A second approach uses a metal wheel which is crowned. The blade is tensioned (i.e., stretched in the center) to mate with the crowned surface of the wheel, thus eliminating the flange to keep the blade tracking true on the wheel. Again, high band strain is required to provide adequate band driving force. Also skilled personnel are required to properly maintain tensioned blades.

A third approach uses a metal wheel incorporating a tire having a crowned surface. This combination provides means for proper band tracking, reduces band strain necessary for required driving force, and does not require band tensioning. While this third approach eliminates many of the problems encountered with the first two approaches, three inherent difficulties are present in high speed, high driving force applications. First, replacement of bad or worn tires is difficult in the field as balancing of the tire and the wheel must be accomplished after the tire is installed. Second, centrifugal force generated at the rim of a high speed wheel creates high forces outward on the tire, and bonding of the tire to the rim is difficult to maintain. The third difficulty is associated with the second in high driving force applications where the force required between tire and blade is high and causes the tire to want to rotate and break the bond between the wheel and tire. These high driving force applications become a problem with expensive solutions such as notched tires and wheels being commonly used.

It is the purpose of this invention to provide a metal wheel with crowned tire that can be easily mated together, requiring no field balancing, and transmitting high driving force inexpensively and simply.

SUMMARY OF THE INVENTION

The invention combines a pulley and belt with the belt slightly larger than the pulley so it can be easily slipped over the pulley to form a tire mounted band saw wheel. (The combination of belt and pulley are not used as originally intended, i.e. to transmit power from one pulley to another, but instead, to use the two as one unit in which the back side of the belt transmits power to the band saw blade.) The tire is, in effect, "loose" on the wheel and does not contribute to unbalance of the wheel, yet the strain of the blade against the outer surface of the belt wedges the belt against the pulley for ample driving force at those surfaces and the surfaces between belt and band saw blade. The pulley-belt combination selected allows the outer surface of the belt to protrude slightly above the outer surface of the pulley, thus allowing the belt to form a crown upon which the blade tracks.

Accordingly, it is the object of the present invention to utilize a belt and pulley in combination to become a single band saw wheel, which inexpensively transmits high driving force with low band saw strain, is easy to balance, and has a crown on the wheel which eliminates band saw blade tensioning.

DESCRIPTION OF THE PREFERRED EMBODIMENT

Figure 1:
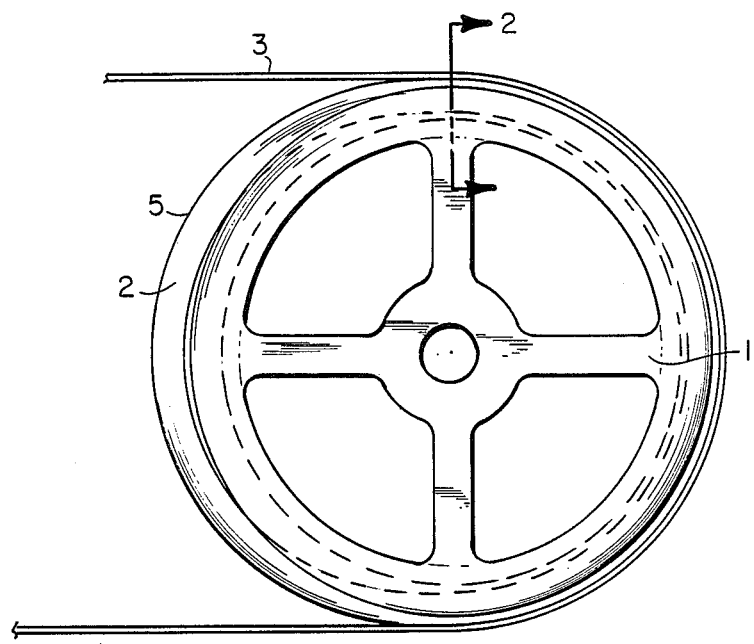
FIG. 1 is a side view of the band saw wheel with a band saw blade installed.
Figure 2:
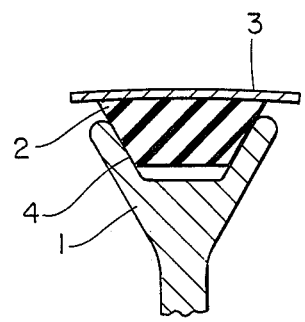
FIG. 2 is a partial, cross-sectional view of the apparatus taken along the line 2—2 in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings, FIG. 1 generally indicates a band saw wheel of the preferred embodiment. The band saw wheel 1 has a "V" groove shape 4 of a typical "V" groove pulley. The tire 2 has the typical shape of a mating "V" belt and is perhaps a reinforced "V" belt with an outer surface slightly larger in diameter than the wheel. The band saw blade 3 pushes the tire 2 into the "V" shape 4 around that portion of the wheel which is wrapped by the blade 3. The rest of the tire 2 is free to float free of the wheel 1. The mating surfaces of belt 2 and "V" shape 4 combine to provide friction between wheel 1 and tire 2. The mating surfaces between tire 2 and blade 3 combine to provide friction between tire 2 and blade 3. In actual operation, the expanded portion of the tire 2 is held in a more or less smooth curve shape 5 by centrifugal force. That curve 5 is of different diameter than the opposite portion. A self cleaning effect occurs during each revolution as the belt 2 changes shape and throws off unwanted particles which would otherwise build on belt 2.

What is claimed is:

1. In a band saw having a band saw blade, a wheel for supporting the blade, comprising a pulley having a groove extending around its periphery between radially extending flanges, a tire having a lower portion for mating to the pulley's groove and an outer surface, the tire having an inner circumference greater than the circumference of the pulley around the bottom of the groove to permit the tire to be loosely mounted in the pulley's groove and freely movable therein, the blade received against an outer surface of an arcuate portion of the tire and forces the lower portion of that arcuate portion into the groove to form the outer surface of the arcuate portion into a crown, the tire sized to ensure that the outer surface of the arcuate portion against the blade extends radially outwardly of radially outwardly facing edges of the flanges to maintain the outer crowned surface in contact with the blade to keep the blade aligned.

2. The wheel of claim 1 wherein the inner circumference of the tire is sufficiently larger than the circumference of the pulley around the bottom of the groove so that the blade acting against the outer surface of the arcuate portion of the tire forces a radially opposed portion of the tire away from the pulley a sufficient distance to permit self-cleaning to occur.

3. The apparatus of claim 2 wherein the pulley is a standard "V" pulley and the tie is a standard "V" belt.

4. The apparatus of claim 2 in which the band saw blade has a width greater than a width of the tire at its outer surface.

5. In a band saw having a band saw blade, a wheel for supporting the blade, comprising a pulley having two radially extending flanges around the periphery of the pulley defining a groove of generally consistent shape therebetween, the pulley having an inner circumference around a bottom surface of the groove, a flexible annular tire having a generally consistent inside shape which mates to the groove of the pulley and having an inner circumference larger than the pulley's inner circumference such that the tire floats when mounted on the pulley, the tire having an outer circumferential surface configured to receive a band saw blade against a portion thereof which pushes the inside shape of this portion into the groove, the tire sized to ensure that the portion of its outer circumferential surface which contacts the band saw blade extends radially outwardly of radially outwardly facing edges of the flanges to support the blade against the tire's outer circumferential surface radially outwardly of the radially outwardly facing edges of the flanges.

6. The apparatus of claim 5, wherein the wheel is a standard "V" pulley and the tire is a standard "V" belt.

7. The apparatus of claim 5 in which the band saw blade has a width greater than the width of the tire.

8. The apparatus of claim 5 in which the outside surface of the tire defines a crowned shape for alignment of the band saw blade, and the blade rides against the crowned shape.

* * * * *